2 Sheets—Sheet 1.

J. REESE.

MACHINE FOR SLITTING RAILROAD RAILS.

No. 7,680.

Reissued May 15, 1877.

WITNESSES.

James K. Bakewell

R. C. Wrenshall

INVENTOR.

Jacob Reese by Bakewell & Kerr

Attorneys

2 Sheets—Sheet 2.

J. REESE.

MACHINE FOR SLITTING RAILROAD RAILS.

No. 7,680. Reissued May 15, 1877.

Witnesses.
James K. Bakewell
R. W. Trenihall

Inventor.
Jacob Reese
by Bakewell & Kerr
Attorneys

UNITED STATES PATENT OFFICE

JACOB REESE, OF PITTSBURG, PENNSYLVANIA.

IMPROVEMENT IN MACHINES FOR SLITTING RAILROAD-RAILS.

Specification forming part of Letters Patent No. 180,373, dated July 25, 1876; reissue No. 7,680, dated May 15, 1877; application filed March 24, 1877.

*To all whom it may concern:*

Be it known that I, JACOB REESE, of Pittsburg, in the county of Allegheny and State of Pennsylvania, have invented a new and useful Improvement in Machines for Slitting Railroad-Rails; and I do hereby declare the following to be a full, clear, and exact description thereof, reference being had to the accompanying drawing, forming part of this specification, in which—

Figure 1:
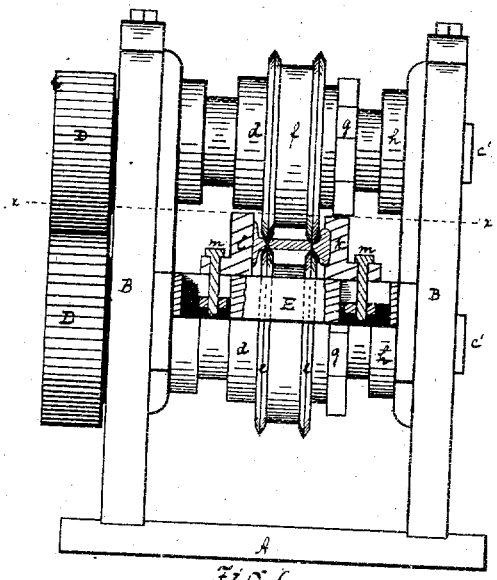
Figure 2:
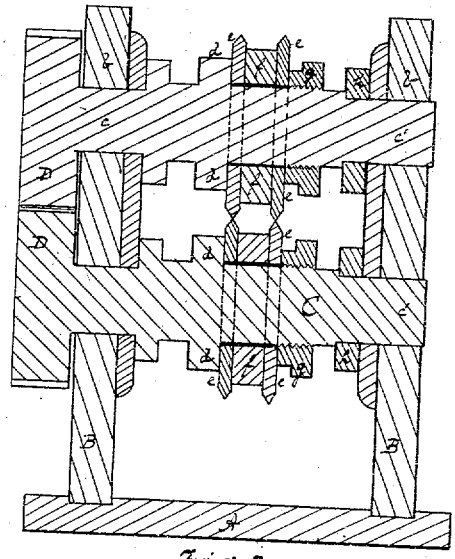
Figure 3:
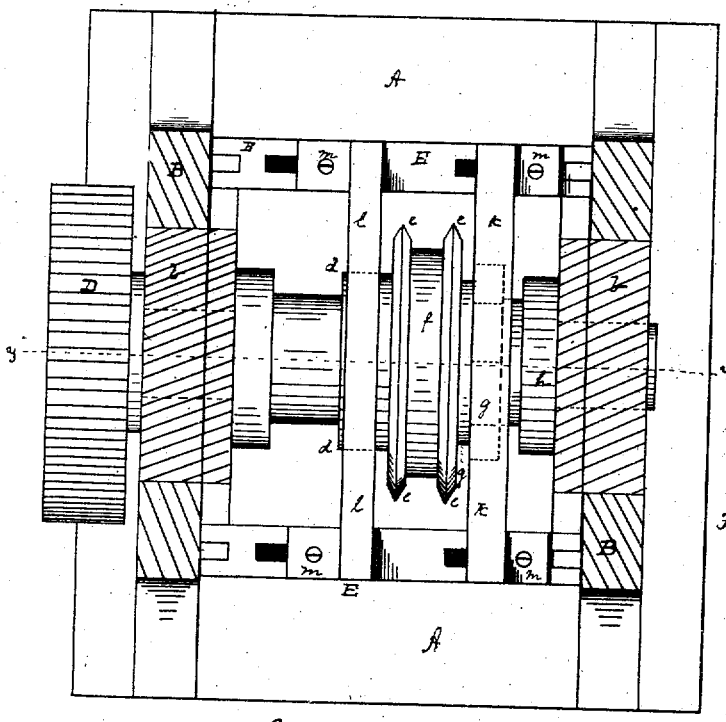
Figure 8:
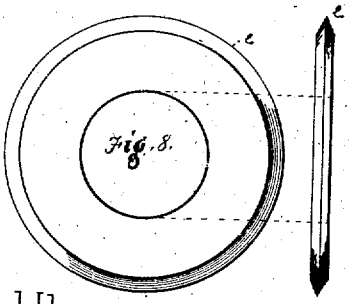
Figure 7:
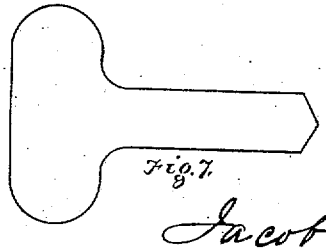

Figure 1 is an elevation of a machine embodying my invention. Fig. 2 is a longitudinal vertical section. Fig. 3 is a horizontal section on the line *x x*, Fig. 1; Figs. 4, 5, 6, and 7, diagrams showing the manner in which rails may be cut for various purposes; and Fig. 8 is a side elevation of the detachable cutters. Fig. 9 is an edge view of the same.

Like letters refer to like parts wherever they occur.

My invention relates to machinery for slitting railroad-rails, &c.

I will now proceed to describe my invention, so that others skilled in the art to which it appertains may apply the same.

In the drawing, A indicates the bed, and B the housing, of any suitable construction, provided with boxes *b*, in which are journaled the rolls or shafts C, having pinions D, or otherwise geared to move in unison. The well-known housing-screws (not shown) may be used for adjusting the bearings. C represents the shafts or rolls which carry the cutters. The shafts are turned up with the journals *c c'*, and with one or more collars, *d*, to form a shoulder or bearing for one of the detachable cutters, the distance of *d* from the nearest journal being determined by the length of the shaft and the amount of adjustment required for the cutters. *e e* are annular cutting-disks or cutters slipped upon shaft C, and separated by a detachable collar, *f*, the whole being secured by a nut or threaded collar, *g*, which engages with a thread formed on the shaft C. The annular cutting-disks *e e* are beveled upon their peripheries, and are so arranged upon the shaft C that when the rolls are placed in the housings the cutting-edges of the disks upon the upper roll and the cutting-edges of the corresponding disks upon the lower roll will be in the same vertical plane, so that the rail will be divided by a chisel-cut from two sides. However the cutting-disks are adjusted, the relative arrangement of the corresponding cutters of the two rolls must be preserved, as before specified. In order to preserve the relations of the journal, and to steady the roll, a loose journal collar, *h*, is slipped upon the journal, and bears against the shoulder of shaft C. The width of detachable collar *f* may be such as to adjust the cutting-disks for a small or low rail, and when high rails or wider webs are to be cut, annular washers may be interposed; or, if preferred, collars of different widths may be used. The fixed collar or collars *d* may be cast or turned up with the roll, or may be shrunk on the shaft, as preferred.

In slitting rails the tendency of the flange and head-pieces, so cut, is to curve outward from the web. (See diagram.) To prevent this I make use of the adjustable guide-bars, so as to cause the pieces when cut to pass out of the rolls in a straight condition ready for subsequent use. Supported upon cross-bars E, secured to the housings, is the above-mentioned rail-guide composed of two adjustable plates, *k l*—the one, *k*, grooved to receive the head of the rail, and the other, *l*, plain, to accord with the base or flange. Either or both of the plates may be adjusted at pleasure, or according to the size of the rail, by means of the bolts *m*, which pass through slots in the cross-bars E. The several parts composing the roll being constructed substantially as specified, one cutter, *e*, is slipped upon shaft C and passed up to collar *d*. A loose collar, corresponding to the width of the web of the rail to be slit, or, if a collar of such width is not at hand, then a collar of less width, together with a sufficient number of washers to make up the difference, is next put on the shaft, after which the other cutting-disk is added, and the whole secured by the threaded collar *g*.

Two such cutting-rolls having been adjusted in the housings, the position of the rail-guide with relation to the cutters is regulated by sliding the plates on the cross-bars E, after which the guide is fixed by the bolts *m* and nuts. Power being applied to the rolls, and the rail properly heated and placed in the guides, the collar *f* will bite upon the web and cause the rail to travel through the rolls between the cutters; when, if the several adjustments specified have been carefully made, the lines of cut will be continuations of the outline of each section of the rail, (see diagram, Fig. 5,) thus leaving no projections, as shown in diagram, Fig. 4, and avoiding laps or seams in the finished bars.

Figure 5:
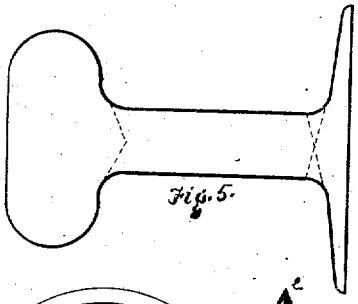
Figure 4:
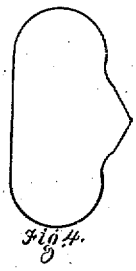
Figure 6:
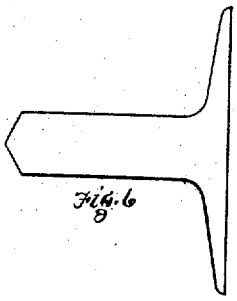

The adjustment of the cutters so as to slit the rail into three sections—head, web, and flange, as shown in diagram, Fig. 5—is that I usually employ in producing bars, hoops, baleties, &c.; but if it is desired to cut off the head of the rail only, so as to leave the web and flange in one piece, (see diagram, Fig. 7,) to be thereafter rolled in T-iron, this may be done by loosening collar *g* and removing the cutter nearest the plain guide-plate; or, if the flange of the rail only is to be cut off, (see diagram, Fig. 6,) so as to leave the web and head connected, in which condition it will be found adapted to be rolled into plow-beams and similar articles, this can be done by removing the cutter nearest the grooved guid plate.

From the foregoing description it is evident that, in addition to the advantages specified over those machines wherein the cutter and roll are formed in one, by my improved construction the cutters may be adjusted to cut portions only of the rail, leaving it in various forms adapted to utilization in well-known manufactures. While this may not seem of special advantage in using up rails made of weldable metal, its great advantage is apparent in the utilization of old Bessemer-steel rails, rail ends, &c., which are accumulating at the works and elsewhere, which it is very difficult, if not impossible, to weld, and which, if reworked to advantage, must be reworked in the rolls.

Having thus described my invention, what I claim, and desire to secure by Letters Patent, is—

1. In a machine for slitting rails, &c., the combination of the bevel-edged adjustable and detachable cutters, one above the other, for cutting the metal simultaneously on the two opposite sides, substantially as specified.

2. In a machine for slitting railroad-rails, the combination of the rolls, provided with adjustable cutters, and the adjustable rail-guide, substantially as and for the purpose pecified.

3. In a machine for slitting railroad-rails, the combination of the two slitting-rolls with the rail-guide, substantially as and for the purpose specified.

In witness whereof I, the said JACOB REESE, have hereunto set my hand.

JACOB REESE.

Witnesses:
JAMES BLACK,
L. C. FITLER.